United States Patent Office 3,189,455
Patented June 15, 1965

3,189,455
VESICULAR PHOTOGRAPHIC MATERIALS CONTAINING A POLYAMIDE VEHICLE
Alfred F. Daech, New Orleans, La., assignor to Kalvar Corporation, New Orleans, La., a corporation of Louisiana
No Drawing. Filed Apr. 30, 1962, Ser. No. 191,288
4 Claims. (Cl. 96—91)

The present invention relates to new photographic materials which are useful for producing vesicular or "scatter center" images by exposure to light and development by dry heat.

It is known in the photography art that vesicular or scatter center images may be created in certain types of photographic films by means of small bubbles of gas which are formed and trapped in the areas of the film exposed to light. Generally speaking, a film of this type comprises a colloid or resin coating or vehicle on an appropriate backing material with a light-sensitive agent or sensitizer, most commonly a diazo compound, dispersed throughout the coating. When such a film is exposed to light, the light sensitive agent or sensitizer decomposes and releases molecules of a gas which in the case of a diazo sensitizer, is nitrogen. Upon heating the thus exposed film, the released gas forms the desired vesicular image according to the exposure pattern. Presumably, this phenomenon occurs in the development because the vehicle is relaxed sufficiently on heating to permit the released gas molecules to form bubbles which expand. The resulting scatter centers or vesicles make the vehicle opaque to transmission of light in the exposed areas and also reflect and scatter light so that they appear white.

The early vesicular materials employed gelatin as the vehicle. These suffer from the difficulty that the vesicular images obtained therein fade rapidly. Later work has revealed that this problem of fading was caused, in part, by the sensitivity of gelatin to moisture. In particular, it has been found that gelatin vehicles tend to absorb moisture which in turn destroys the image.

A significant advance in the vesicular photography art which avoids the difficulties inherent in the use of gelatin, is described in the copending application of James and Parker, Serial No. 623,050, now Patent No. 3,032,414, the subject matter of which is incorporated herein by reference. In that improvement, a film-forming vehicle is prepared from certain non-hygroscopic resin materials which are combined with a sensitizer in an organic solvent or solvent mixture for the components. A uniform water-free mixture of the components is formed in the solvent and this can be applied to the backing to form the desired vehicle.

Non-hygroscopic resin materials which are described in said James et al. application as satisfactory are the synthetic, water-insoluble, non-hygroscopic, non-water swelling highly linear thermoplastic resins selected from the group consisting of homopolymers of styrene, homopolymers of vinyl chloride, homopolymers of vinylidene chloride, copolymers of vinyl chloride with a different vinyl monomer and copolymers of vinylidene chloride with a vinyl monomer. According to James et al., the resinous vehicles must have a permeability constant for nitrogen within the range of $8.6 \times 10^{-16}$ to $8 \times 10^{-10}$ to avoid escape of the gas before development and nevertheless permit sufficient diffusion of the released gas to form vesicles during the development. The preparation of the vehicle must also avoid unduly high temperatures and other conditions which lead to the decomposition of the sensitizer.

The present invention is based on the discovery that the resinous vehicles used to prepare the photographic material described in said James et al. application may be completely or partially replaced by a water/alcohol soluble nylon resin to give a photographic material which upon exposure and development, as in the James et al. application, gives an excellent and desirable image which is stable and resistant to moisture and high temperature. This is surprising in the light of the undersirable results obtained using gelatin as the film-forming vehicle due to the water-sensitivity of the gelatin.

Accordingly, it is the principal object of the present invention to provide another photographic material for obtaining a desirable vesicular record. Other objects will also be apparent from the description which follows.

As indicated, the objects of the invention are achieved by employing as the film-forming vehicle a polyamide resin which is soluble in a mixture of water and alcohol. In preparing the material of the invention, the polyamide is preferably dissolved in a mixture of water and lower aliphatic alcohol, e.g. methyl or ethyl alcohol, and the light-sensitive agent, e.g. diazo, is likewise dissolved in a similar mixture of alcohol and water. These two solutions are then combined and coated onto any suitable supporting material such as "Mylar" film. After drying to remove the solvent, the resulting photographic film may be exposed to light and developed by dry heating briefly to produce a photograph which is stable at elevated temperatures and in the presence of substantial moisture. The film is also characterized by a permeability constant for nitrogen within the range stated in the James et al. application, i.e. between $8.6 \times 10^{-16}$ to $8 \times 10^{-10}$, this constant being the number of cubic centimeters of nitrogen transmitted at 30° C. by an area of one square centimeter in one second when the pressure gradient is one centimeter of mercury per centimeter of transmission layer thickness.

Any film-forming water/alcohol soluble polyamide may be used for the purpose of the present invention. One commercially available form of such polyamide is sold under the name of "Zytel No. 61." "Zytel No. 61" is a soluble nylon which is an interpolymer condensation product of the hexamethylene diamine, adipic acid, sebacic acid and caprolactam. Usually the polyamide solubility should be such that a mixture of from 0 to 20% water and from 100 to 80% alcohol, on a weight basis, is satisfactory for use herein. The alcohol, as noted, may be methyl, ethyl, or propyl alcohol.

The light sensitive agent or sensitizer used herein should be non-reactive to the vehicle and should be decomposable upon exposure to light to form decomposition products which are also non-reactive to the polyamide vehicle and upon warming volatilize to form the desired light scattering discontinuities. This agent should also be soluble in the mixture of alcohol and water used for preparing the film. Any of the light sensitive or photolytic agents mentioned in the James et al. application are suitable for use herein. This includes a wide variety of diazo compounds which liberate nitrogen on exposure to light such as para-diazo dimethyl aniline zinc chloride, p-diazo diphenylamine sulfate, p-diazo diethylaniline zinc chloride, p-diazo ethyl hydroxyethylaniline zinc chloride, p-diazo ethyl methyl aniline zinc chloride, p-diazo diethyl methyl aniline zinc chloride, p-diazo ethyl hydroxyethylaniline zinc chloride, 1-diazo-2-oxynaphtha-lene-4-sulfonate, p-diethylaminobenzene diazonium chloride, $ZnCl_2$-4-benzoylamino-2,5-diethoxybenzene diazonium chloride, the p-chlorobenzene-sulfonate of 4-diazo-1-cyclohexylaniline, the p-chlorobenzene sulfonate of 4-diazo-2-methoxy-1-cyclocyclo-hexylaminobenzene, the tin chloride double salt of 4-N-methylcyclohexylaminobenzene diazonium chloride, p-acetaminobenzene diazonium chloride, 4-dimethylaminobenzene diazonium chloride, 3- methyl-4-diethylaminobenzene diazonium chloride, 4-morpholinobenzene diazonium chloride, 4-piperidyl-2,5-diethoxy benzene diazonium chloride, 1-dimethyl amino naphthalene-4-diazonium chloride, and 4-phenyl amino diazo benzene diazonium chloride.

If desired, the polyamide film of the present invention may be prepared and used in the unsupported form. Preferably, however, this film is supported on some suitable material. The support material may be transparent or opaque. Of the transparent supports, glass, ethyl cellulose, "Mylar" (oriented polyethylene terephthalate) and similar substances are satisfactory provided they withstand the operational temperatures required and are relatively free from plasticizers which tend to diffuse into the coating or film of vehicle and sensitizer. Cellulose acetate supports which, generally speaking, are undesirable because they contain diffusible plasticizers, can be used if a suitable barrier layer is interposed between the support and the polyamide film or coating thereon.

Opaque supports are preferably flexible such as paper or synthetic sheet material. These supports can be of any color, but for certain purposes, black supports are particularly suitable. The vesicles or bubbles appear white on such black supports so that a positive image is produced directly. When transparent supports are used, the vesicular photographs can be used as negatives since the light-exposed areas are opaque to transmitted light only.

After exposure to light in a camera or other suitable device, the films of the invention are developed by heating to an elevated temperature, preferably in the range of 225–300° F. The time of exposure will generally vary inversely with the temperature, but will usually be in the range of 1–10 seconds.

The following example illustrates the preparation of a scatter center record material according to the invention and its use.

*Example*

375 grams of Zytel No. 61 (Du Pont nylon resin) were dissolved in a mixture of 375 grams water and 1600 grams of methanol at 150° F.

A sensitizer solution was then prepared by dissolving 37.5 grams of Edwal No. 8 (p-diazodimethylaniline zinc chloride) in a mixture of 50 grams water and 100 grams methanol at 125° F.

The resin and sensitizer solutions were then mixed together at 125° F. and coated onto a Mylar film (about 0.5 mil thick) using a conventional doctor blade. The thus coated Mylar was then dried at 200° F. to remove water and alcohol. The resulting film was exposed to the light of a General Electric AH-6 lamp, a source high in ultraviolet wave length content and thereafter developed by dry heat of about 250° F. for approximately 3 seconds. An excellent, stable image was produced where the ultraviolet light of the AH-6 lamp had decomposed the sensitizer. A second image was produced by exposing the film to the AH-6 lamp for 30 seconds and applying the film face down on a typewritten page. This was then exposed through the film to an infrared source and where the letters appeared on the typewritten page, development took place. This produced opaque areas in the film and the other areas remained transparent.

Another film was prepared in the manner outlined above except that the methanol was replaced by ethanol with essentially equivalent results.

It will be appreciated that various modifications may be made in the invention described herein without deviating from the scope thereof as set forth in the following claims.

I claim:
1. A scatter center photographic material for producing a record by light scattering discontinuities within an otherwise optically homogeneous vehicle, said material consisting essentially of a dry film of water/alcohol soluble synthetic polyamide with a light decomposable solid agent substantially uniformly dispersed therein, said polyamide film having a permeabiliy constant within the range of $8.6 \times 10^{-16}$ and $8.0 \times 10^{-10}$, said constant being the number of cubic centimeters of nitrogen transmitted at 30° C. by an area of one square centimeter in one second when the pressure gradient is one centimeter of mercury per centimeter of transmission layer thickness and said decomposable agent itself being non-reactive to said vehicle and upon exposure to light decomposing into products which are also chemically non-reactive to said vehicle and which solely upon warming are volatile to form said radiation scattering discontinuities only in the light struck areas in said polymer to thereby furnish said record.

2. The scatter center photographic material of claim 1 including a supporting base.

3. The material of claim 2 wherein said base is transparent.

4. The material of claim 2 wherein said base is opaque.

References Cited by the Examiner

UNITED STATES PATENTS

| | | | |
|---|---|---|---|
| 2,423,460 | 7/47 | McQueen | 96—91 X |
| 2,779,062 | 1/57 | Stasny | 260—2.5 |
| 2,996,381 | 8/61 | Oster et al. | 96—49 |
| 3,032,414 | 5/62 | James et al. | 96—91 |
| 3,037,862 | 6/62 | Neth | 96—49 X |

OTHER REFERENCES

Simonds et al.: Handbook of Plastics, 2nd edition, 1949, D. Van Nostrand Co., Inc., New York, pages 143 and 484.

Lindquist et al.: IBM Technical Disclosure Bulletin, vol. 4, No. 2, July 1961, page 61.

NORMAN G. TORCHIN, *Primary Examiner.*

HAROLD N. BURSTEIN, *Examiner.*